Aug. 3, 1965   R. W. TRIPP   3,198,923
ROTOR INDICATING DEVICE
Original Filed May 10, 1961   2 Sheets-Sheet 1
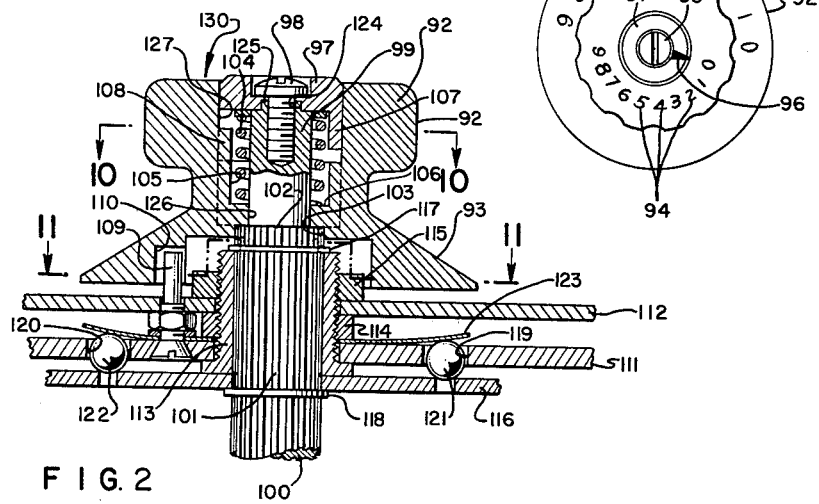
FIG. 1
FIG. 2
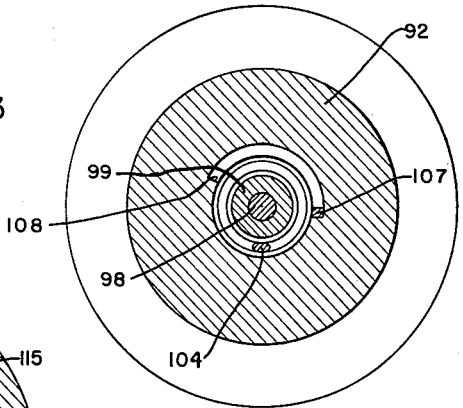
FIG. 3
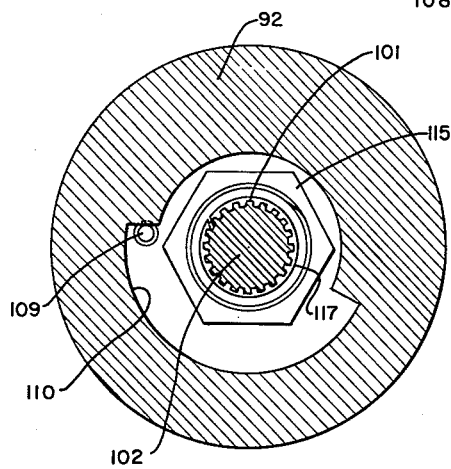
FIG. 4
INVENTOR.
ROBERT W. TRIPP
BY W. E. Beatty
ATTORNEY

United States Patent Office 3,198,923
Patented Aug. 3, 1965

3,198,923
ROTOR INDICATING DEVICE
Robert W. Tripp, Eastchester, N.Y., assignor to Inductosyn Corporation, Carson City, Nev., a corporation of Nevada
Original application May 10, 1961, Ser. No. 109,078, now Patent No. 3,105,142, dated Sept. 24, 1963. Divided and this application Feb. 4, 1963, Ser. No. 255,777
7 Claims. (Cl. 200—167)

This application is a division of S.N. 109,078, filed May 10, 1961, for Digital-to-Analog Converter With Zero Offset, now Patent 3,105,142, dated September 24, 1963.

This invention relates to an indicator for digital-to-analog converter which will accept digital input information, on a decimal or other basis, of the desired extent of travel of a driven element such as a machine element or tool in terms of input data of the workpiece co-ordinate and other input data representing the zero offset between the workpiece zero and machine zero, with a converter for producing corresponding analog voltages representing the desired travel of the driven element.

A further object of this invention is to provide an indicator for digital-to-analog converter capable of simultaneously acccepting two multidigit inputs and providing analog voltages representative of the positions corresponding to the sum of the two multidigit numbers.

A further object of the invention is to provide an indicator for a shaft. The shaft may be an element of a rotary switch. Preferably, the rotary switch controls the circuits for a digital-to-analog converter claimed in original application S.N. 109,078 of which the present application is a division, the indicator dealing with the zero offset of the tool position with respect to the work, in a machine tool control system. While the converter can be used with various data elements such as resolvers, or synchros, it is particularly adaptable to use with an Inductosyn and more particularly with an Inductosyn in a form wherein the coarse, medium and fine windings of the slider, as well as the scale, each appear on a common support, as described and claimed in patent application S.N. 29,972, filed May 18, 1960, for Precision Transducers.

FIG. 1 is a plan view of one of one of the 6 identical indicators or knobs of the present invention shown in FIG. 2 of Patent 3,105,142, for the introduction of the numerical data.

FIG. 2 is an enlarged vertical sectional view through one of the indicators or knobs of FIG. 1.

FIGS. 3 and 4 are cross sectional views on lines of the corresponding numbers in FIG. 2, looking in the direction of the respective arrows.

Figure 5:
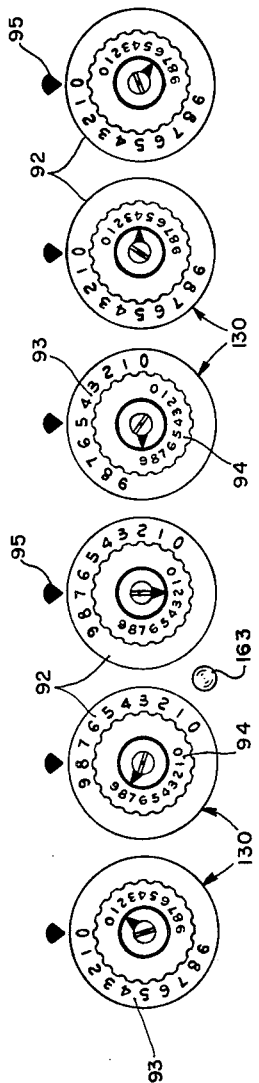
FIGS. 5 and 6 are plan views of the input indicators or knobs and their scales and are used in conjunction with FIGS. 5 and 6 of Patent 3,105,142 to describe methods of setting zero offset.
Figure 6:
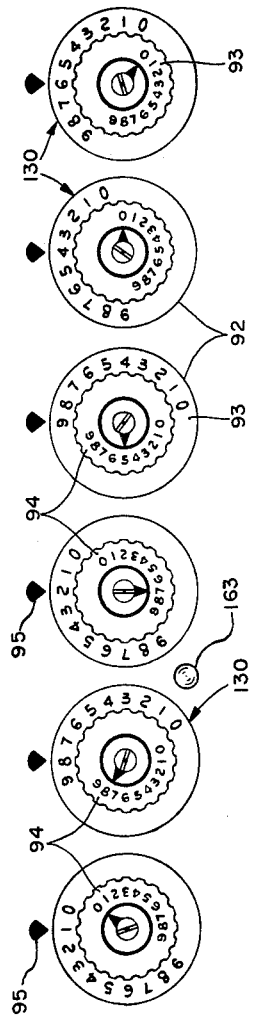

FIG. 1 shows a front view of knob 92 of the knob or indicator assembly 130 showing an outer scale 93 and an inner scale 94. Scale 93 is read with reference to fixed index 95, while scale 94 is read with respect to shaft index 96. Index 96, is engraved on the surface of stop member 97, which is secured to the reduced section 99 of shaft 100 by screw 98.

Referring to FIG. 2, the shaft 100 is typical of the shafts S1 to S6 in FIGS. 3 and 4 of Patent 3,105,142 and has a spline indicated at 101 throughout its entire length for ease of connecting thereto the various swingers previously described. In FIG. 2, the upper end 102 of this spline is employed as an element making it possible to couple the knob 92 with or uncouple it from the shaft. For this purpose, the knob 92 has a mating spline 103, and the knob 92 is resiliently urged in a direction to couple the splines 102 and 103 together by a spring 104 which is mounted in a spring barrel 105 formed by a recess in the knob 92. Spring 104 bears at its upper end against the underside of stop 97, and at its lower end against the end 106 of the spring barrel.

The spline 101 has 20 equally spaced teeth. Consequently knob 92 can be engaged with shaft 100 at intervals of 18 degrees. The relationship of the spline end 102, the mating spline 103 in the knob 92, the shaft index 96 and the scale 94 is such that when the knob is engaged with the shaft, the index 96 will be in alignment with a number of scale 94. A tongue 107 on stop 97 is arranged to engage stop 108, which is part of knob 92, to limit the relative rotation between knob 92 and shaft 100 so that shaft index 96 cannot rotate beyond the ends of scale 94. A stop screw 109 mounted to subpanel 111 extends through main panel 112 to engage stop groove 110 in knob 92. The position and extent of stop groove 110 is such that in combination with stop screw 109, knob 92 is limited in rotation so that scale 93 cannot rotate beyond fixed index 95. Shaft 100 is mounted for rotation by bushing 113 which is secured to subpanel 111 by nut 114 and to main panel 112 by nut 115. A detent plate 116 which contains 20 equally spaced holes on a common radius is secured against rotation to shaft 100 by spline teeth which engage the splined extended shaft portion 101. Shaft 100 and detent plate 116 are secured against longitudinal motion by retaining rings 117 and 118 which engage grooves in shaft 100. Diametrically opposite holes 119 and 120 in subpanel 111 and lying on the same radius as the holes in detent plate 116 contain balls 121 and 122 which are urged against detent plate 116 by a leaf spring 123. Leaf spring 123 is secured to subpanel 111 by nut 114 and bushing 113.

Stop 97 is secured against rotation to shaft 99 by having a hole 124 which has one or more flats therein to engage a corresponding projection 125 on shaft 99. The cylindrical surface 126 of knob 92 engages shaft 99, and the cylindrical surface 127 of knob 92 engages stop 97 for rotational and longitudinal sliding motion between knob 92 and shaft 100. Stop 97 and knob 92 cooperate to limit the amount that the knob can be pulled out along shaft 99 against the force of spring 105, the travel being so limited that stop screw 109 does not disengage from groove 110.

Subpanel 111 serves as a convenient support for mounting the stationary portions of the various switches, like SW1 through SW10, while splined shaft 101 serves to mount and rotatably position the swingers of these same switches.

Knob 92 and the associated parts described in FIGS. 1 through 4 are identified as knob or indicator assembly 130. From the preceding description it can be seen that knob 92 can be rotated with respect to shaft 100 through the 10 discrete positions indicated by scale 94 and index 96. In addition, the knob can be rotated with respect to the panel through a range of 10 discrete positions as indicated by scale 93 and index 95. It will be noted that clockwise rotation of knob 92 with respect to index 95 causes the numbers on scale 93 to increase, while clockwise rotation of shaft 100 with respect to knob 92 causes index 96 to indicate increasing numbers on scale 94. Thus, the number of steps through which shaft 100 is rotated from the position which it would occupy when both scales are at zero with respect to their indices is equal to the sum of the two numbers indicated on scales 93 and 94. The shaft position measured from the above defined zero will be the sum of the two indicated digits multiplied by 18 degrees. In other words, the position of the shaft 100 is offset from the reading on dial 93 by the value of the reading on dial 94.

I claim:

1. A rotor indicating device comprising a shaft having an axis, an adjustable handle on said shaft, said shaft having a plurality of rotary positions having a uniform spacing corresponding to movement of said shaft through equal angles from one position to the next position, means for arresting the movement of said shaft at each of said positions, and means including a coupling between said shaft and said handle having an array of uniformly spaced members for selectively locating said handle on said shaft in various uniformly spaced rotary positions having an angular spacing with respect to the axis of said shaft the same as the corresponding angular spacing of said shaft positions.

2. A rotor indicating device according to claim 1, comprising stop means having a fixed stop and a stop groove in said handle to limit rotation of said handle through an angle of not more than 180°, said means for selectively locating said handle on said shaft providing for offsetting the rotary position of said handle backwardly to correspondingly readjust the position of said stop groove for rotation of said shaft a corresponding additional amount, and stop means for limiting said selective location of said handle on said shaft.

3. A rotor indicating device comprising a shaft having an axis, an adjustable handle on said shaft, said handle having two scales having calibrations appearing in opposite sequence on complementary portions of said handle, a fixed index for one of said scales and positioned adjacent thereto, an index on said shaft for said other scale, said shaft having a plurality of rotary positions having a uniform spacing corresponding to movement of said shaft through equal angles from one position to the next position, means for arresting the movement of said shaft at each of said positions, and means including a coupling between said shaft and said handle having a circular array of uniformly spaced members for selectively locating said handle on said shaft in various uniformly spaced rotary positions having an angular spacing with respect to the axis of said shaft the same as the corresponding angular spacing of said shaft positions, said other scale being calibrated in terms of the amount of the rotary offset of said handle in a backward direction with respect to said shaft, said one scale being calibrated in terms of the forward direction of handle movement, said scale cooperating to indicate any given shaft position by the addition of their readings.

4. A rotor indicating device comprising a rotary switch having a shaft, an adjustable handle on said shaft, said handle having two scales each having numbers 0 to 9, said scales appearing in opposite sequence on complementary portions of the circumference of said handle, a fixed index for one of said scales and positioned adjacent thereto, an index on said shaft for the other scale, said shaft having a plurality of rotary positions having a uniform spacing corresponding to movement of said shaft through equal angles from one position to the next position, said shaft having a wiper, means for arresting the movement of said shaft at each of said positions, contacts for said wiper at corresponding switch positions and means, including a circular array of uniformly spaced members, for selectively locating said handle on said shaft in various uniformly spaced rotary positions having an angular spacing with respect to the axis of said shaft the same as the corresponding angular spacing of said shaft positions, said other scale being calibrated in terms of the amount of rotary offset of said handle with respect to said shaft in a backward direction, said one scale being calibrated in terms of the forward direction of handle movement, said scales cooperating to indicate any given shaft position by the addition of their readings.

5. A rotor indicating device comprising a shaft having a manually operable knob having a scale, a fixed member, having a fixed index positioned adjacent said scale, said shaft being rotatable around its own axis with respect to said fixed member, means for stopping said shaft at discrete first positions having equal intervals, the number of said first positions contained in one revolution of said shaft being an integer, means for selectively engaging said knob to said shaft at discrete second positions having equal intervals, the number of said second positions contained in one relative revolution between said shaft and said knob being the same as said integer, means for limiting the number of positions between said knob and said shaft to a number less than the total number of said second positions contained in one relative revolution between said shaft and said knob, and means for limiting the number of positions between said knob and said fixed member to a number less than the total number of said first positions contained in one revolution of said shaft.

6. A rotor indicating device according to claim 5, said knob having thereon a first scale having numbers, said first scale having a fixed index, a second scale on said knob, said second scale having numbers, and an index on said shaft for said second scale, said means for selectively engaging said knob to said shaft acting to selectively engage said knob to said shaft at discrete positions corresponding to said numbers on said second scale.

7. A rotor indicating device according to claim 5 said knob having thereon a first scale having numbers, said first scale having a fixed index, a second scale on said knob, said second scale having numbers, and an index on said shaft for said second scale, said means for selectively engaging said knob to said shaft acting to selectively engage said knob to said shaft at discrete positions corresponding to said numbers on said second scale, said first scale being arranged for increasing numbers for one direction of rotation of said knob with respect to said fixed index, and said second scale being arranged for decreasing numbers for said direction of rotation of said knob with respect to said shaft, wherein, for a fixed position of said shaft, the sum of said numbers read on said first and second scales is constant.

References Cited by the Examiner
UNITED STATES PATENTS 2,532,970 12/50 Van Dyke _____ 166—133
2,751,449 6/59 Krahulec et al. _____ 200—11

KATHLEEN H. CLAFFY, *Primary Examiner.*
BERNARD A. GILHEANY, *Examiner.*